C. F. KNOWLTON & F. F. ELLIOT.
MOLD MAKING MACHINE.
APPLICATION FILED JUNE 2, 1910.
1,051,897.
Patented Feb. 4, 1913.
5 SHEETS—SHEET 1.
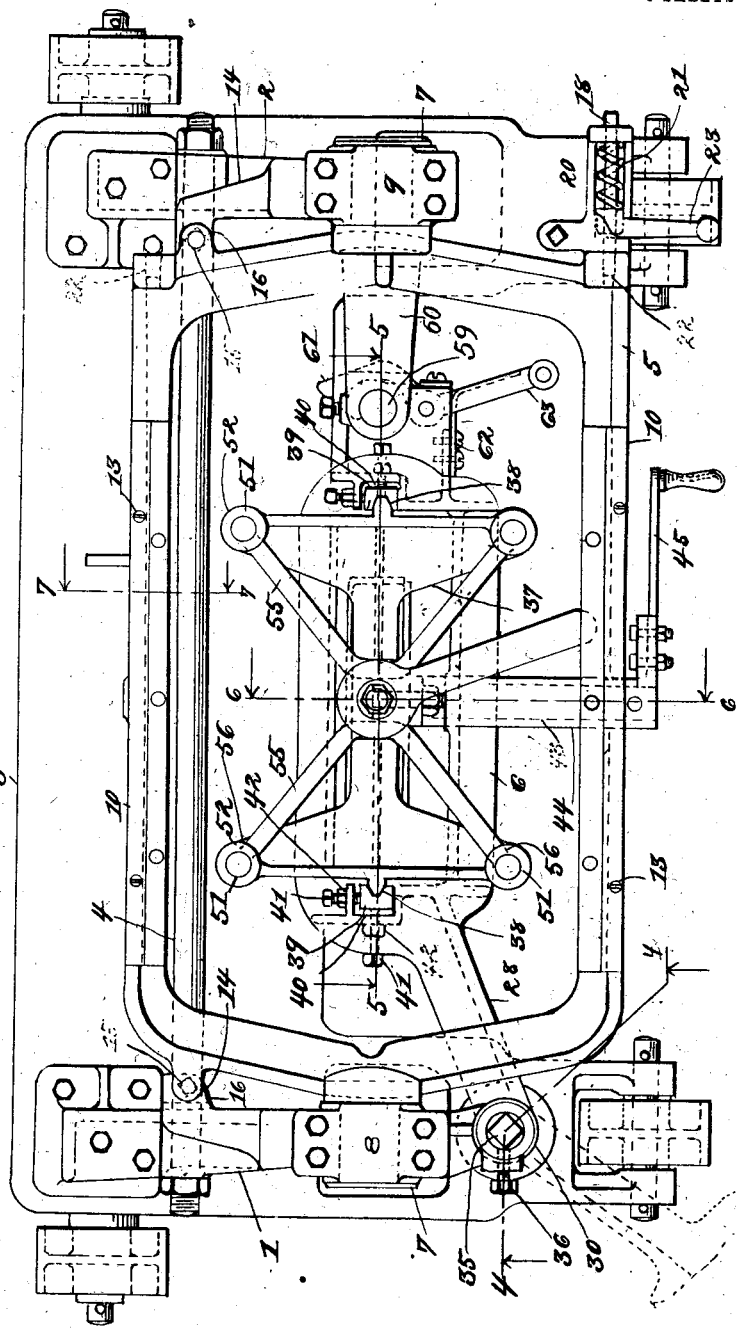
Witnesses.
J. C. Turner
Jno. F. Oberlin
Inventors.
Charles F. Knowlton and
Frank F. Elliot
By J. B. Fay
Attorney.

C. F. KNOWLTON & F. F. ELLIOT.
MOLD MAKING MACHINE.
APPLICATION FILED JUNE 2, 1910.
1,051,897.
Patented Feb. 4, 1913.
5 SHEETS—SHEET 2.
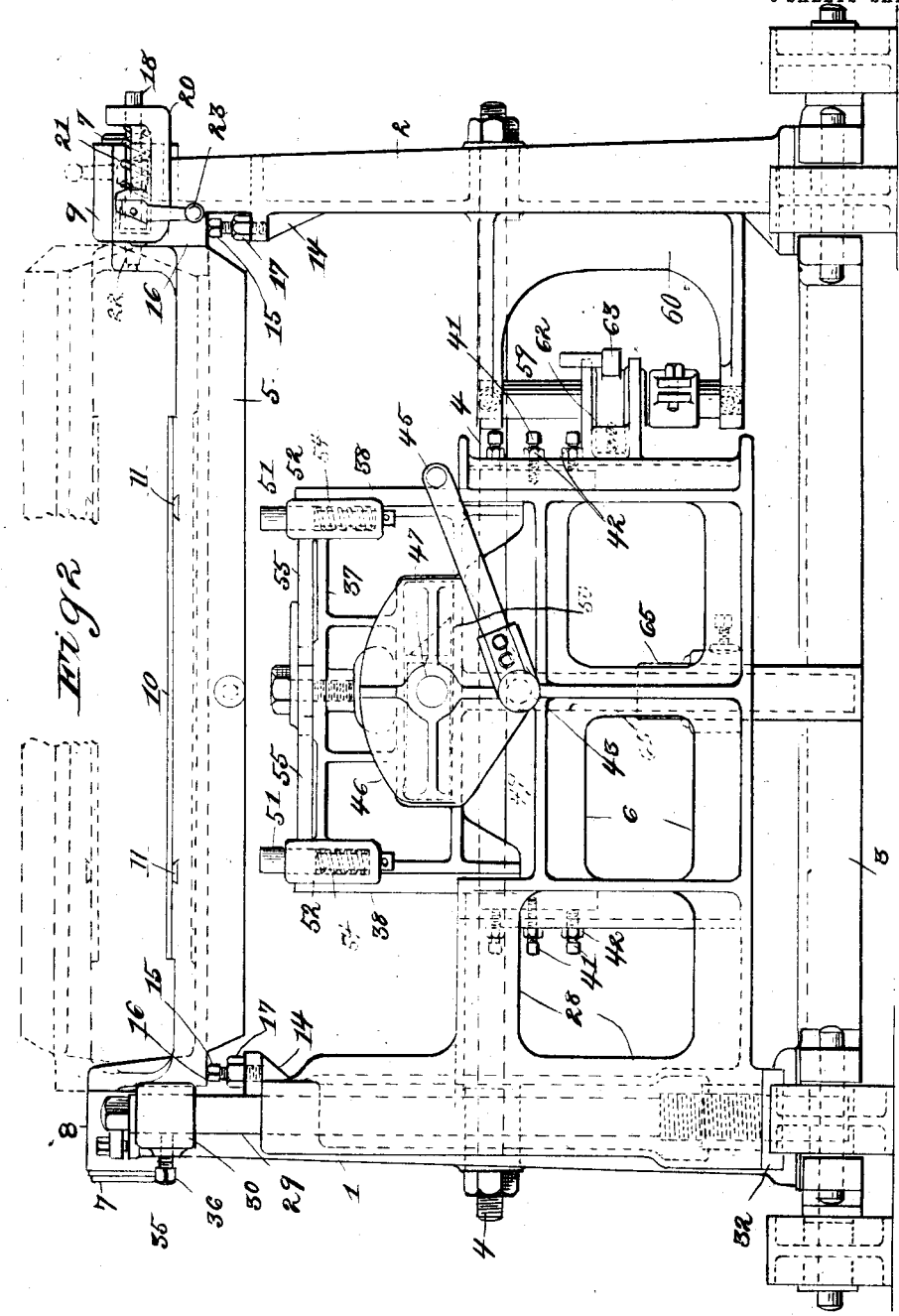

C. F. KNOWLTON & F. F. ELLIOT.
MOLD MAKING MACHINE.
APPLICATION FILED JUNE 2, 1910.
1,051,897.
Patented Feb. 4, 1913.
5 SHEETS—SHEET 3.
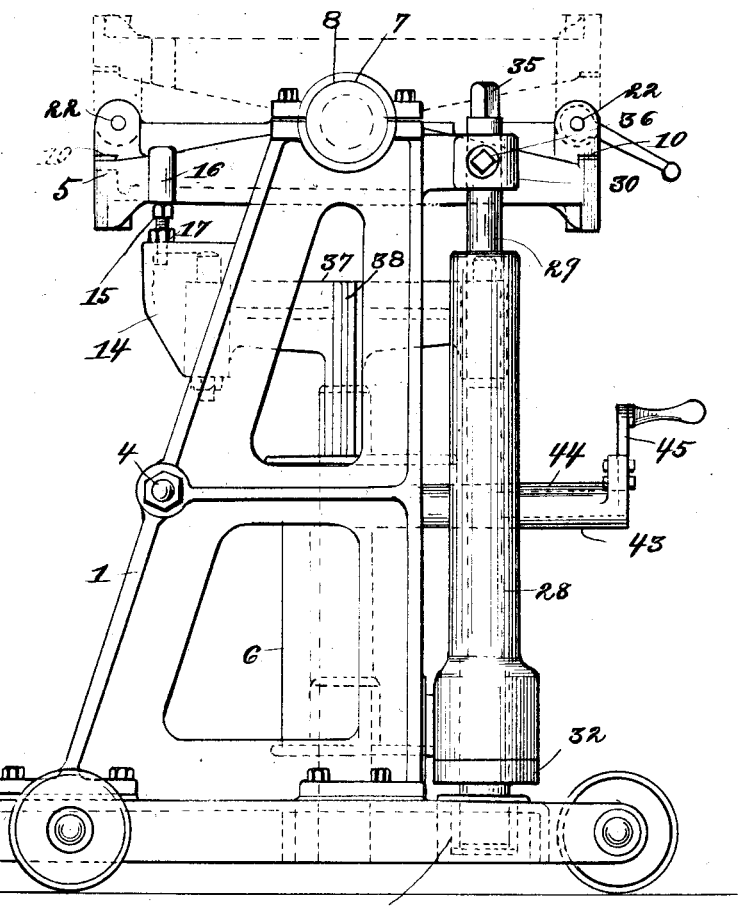
Fig. 5
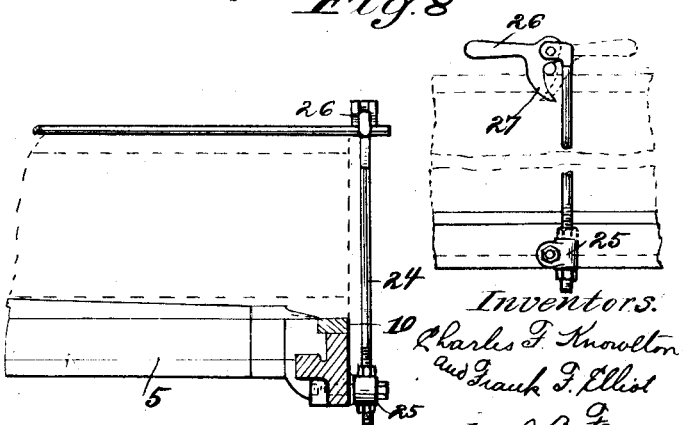
Fig. 7
Fig. 8
Witnesses.
J. C. Turner
Jno. F. Oberlin
Inventors.
Charles F. Knowlton
and Frank F. Elliot
by J. B. Fay
Attorney.

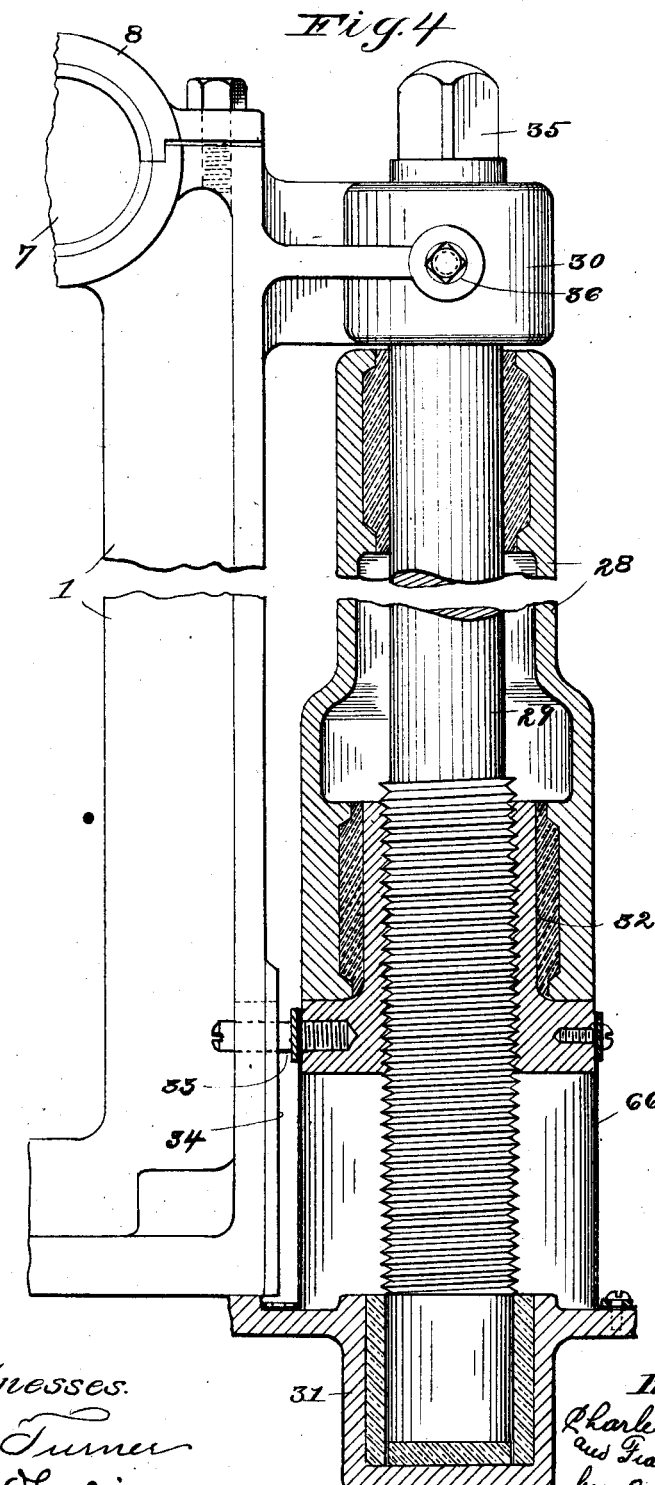

UNITED STATES PATENT OFFICE.

CHARLES F. KNOWLTON AND FRANK F. ELLIOT, OF PITTSBURGH, PENNSYLVANIA, ASSIGNORS TO THE OSBORN MANUFACTURING COMPANY, OF CLEVELAND, OHIO, A CORPORATION OF OHIO.

MOLD-MAKING MACHINE.

1,051,897. Specification of Letters Patent. Patented Feb. 4, 1913.

Application filed June 2, 1910. Serial No. 564,725.

*To all whom it may concern:*

Be it known that we, CHARLES F. KNOWLTON and FRANK F. ELLIOT, citizens of the United States, and residents of Pittsburgh, county of Allegheny, State of Pennsylvania, have jointly invented a new and useful Improvement in Mold-Making Machines, of which the following is a specification, the principle of the invention being herein explained and the best mode in which we have contemplated applying that principle, so as to distinguish it from other inventions.

The general class of molding machines to which the present invention pertains is the so-called roll-over type, which is characterized by having the frame that carries the pattern plate oscillatory about a substantially central axis in place of an axis to one side, as in the familiar rock-over type of molding machine.

The object of the present invention is the provision of such a roll-over molding machine wherein substantially the same degree of accessibility and range of capacity may be secured as in the rock-over machine. In a number of particulars the roll-over type is preferable, especially in its more compact structure, requiring less floor space and in the comparative ease with which the balanced pattern plate support can be rolled over, even when loaded, as compared with the rocking over of such support in the other type of machine.

Our invention further comprehends various detailed improvements whereby ease of operation may be secured in other particulars and perfect work rendered uniformly possible.

To the accomplishment of the foregoing and related ends, then, said invention consists in the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 5:
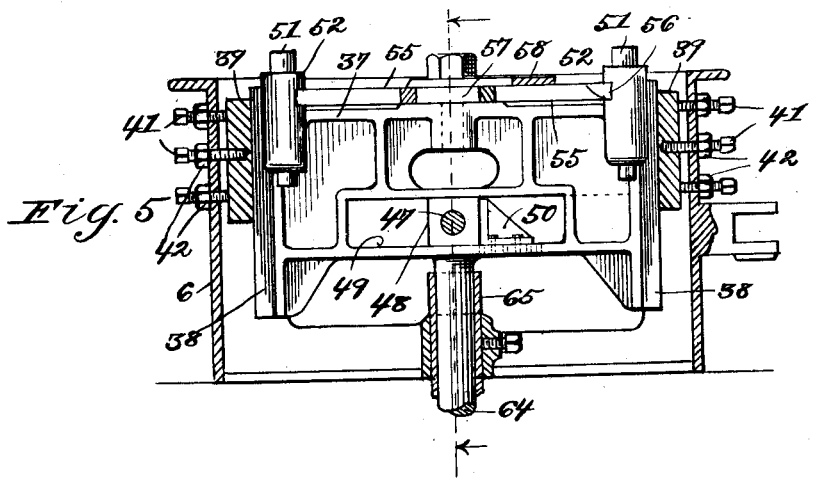
Figure 6:
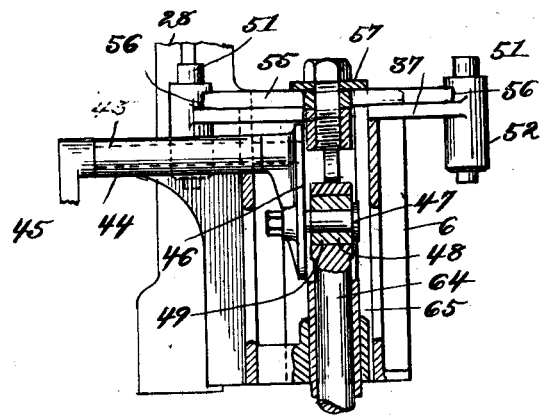
Figure 9:
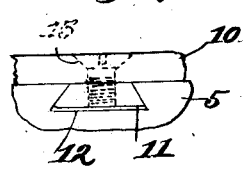
Figure 10:

In said annexed drawings:—Figure 1 is a plan view of a roll over mold making machine embodying our several improvements; Fig. 2 is a front elevation of the same; Fig. 3 is a side elevation thereof viewed from the left in Figs. 1 and 2; Fig. 4 is a sectional view, taken on the line 4—4 in Fig. 1, of the pivotal support for a swinging table that forms one of the features of the machine; Fig. 5 is partly a front elevation and partly a sectional view, taken on the line 5—5 in Fig. 1, of the flask carrier and a portion of said table; Fig. 6 is a section, taken on the line 6—6 in Fig. 1, of a portion of said carrier taken at right angles to the section of Fig. 5; Fig. 7 is a sectional detail, taken on the line 7—7 in Fig. 1, of the pattern frame showing a flask clamping device that is attached thereto; Fig. 8 is another view of a portion of such device; Fig. 9 is an enlarged front elevation of a detail of the pattern frame; and Fig. 10 shows a detail of the flask-carrier.

The general frame of the machine comprises two standards 1 and 2, one at either end, of A-shape and rigidly connected by a heavy transverse member 3 near their lower ends and by a distance rod 4 at a somewhat higher elevation. The space between such standards is thus left substantially clear, as will be obvious upon reference to Figs. 1 and 2. Above the hollow interior space thus provided, is oscillatorily supported the pattern frame 5 to which allusion has been previously made, while movable into and out of such space is a swinging table 6 that is secured to end standard 1 of the machine frame so as to be pivotal about a vertical axis. Such oscillatory pattern frame and swinging table, which latter constitutes a support for the flask upon the separation, or parting, of the latter from the pattern, form the two main operative elements of our machine. Their detailed description will next be taken up in the order indicated.

The pattern frame which is of open construction and of general rectangular form (see Fig. 1) is oscillatorily supported in the fashion previously described, by trunnions 7 at either end, for which suitable bearings 8 and 9 are provided on the respective end standards 1 and 2 of the frame. The main portion of the pattern frame lies in a plane off-set from the axis of oscillation defined by such trunnion bearings, so that, in other words, in the normal position of the frame as shown in full lines in Fig. 2, the portion in question, which is designed to receive the pattern plate and the flask pending the filling of the latter with the sand, lies at a considerably lower level than the axis just defined. Conversely, upon oscillation of said frame into the mold delivery position wherein the flask, in other words, is inverted preparatory to its being separated from the flask carrier (such position being illustrated in dotted outline in said Fig. 2), this main body of the pattern frame will lie in a plane correspondingly elevated above such axis. By thus offsetting such frame body we are, accordingly, enabled to handle flasks of considerable depth without supporting the same at an excessive elevation, such as might render it inconvenient for the workman to place and tamp the sand therein.

Upon each of the longitudinally extending sides of the pattern frame, a narrow plate 10 is adjustably secured, being attached to the pattern frame by means of dove-tailed blocks 11 fitted into correspondingly recessed grooves 12 in the upper faces of the frame sides, as shown in Fig. 9. Screws 13 passing through the plates and into such blocks serve to draw the latter and the plates together so as to securely clamp the pattern plate (not shown) to the frame.

To prevent the pattern frame from rolling over farther than its normal position shown in Figs. 1, 2 and 3, a bracket 14 is provided on the rear of each of the end standards of the main frame, in which bracket is adjustably mounted a set bolt 15, the head of which is disposed so as to be engaged by laterally projecting lugs 16 on said pattern frame. By properly positioning the set bolt, a lock nut 17 being provided to retain the same in adjusted position, the normal position of the pattern frame may be determined with exactness and nicety. To secure the frame in this position, as also in its reversed position, a bolt plunger 18 is reciprocably mounted in a suitable housing 20 therefor provided in end standard 2. A spring 21 normally urges said plunger forwardly to engage with one or the other of two properly located apertures 22 in the corresponding end of the pattern frame. Said plunger is, moreover, provided with a handle 23 that upon being thrown upwardly engages a cam edge thereby withdrawing the bolt, as is necessary preparatory to rolling over the frame.

In order to secure the flask to the pattern frame suitable clamping means require to be provided, such means preferably taking the form of the device illustrated in Figs. 7 and 8. This device consists simply of two links 24 adjustably mounted in lugs 25 provided substantially mid-way between the ends of the respective side members of the pattern frame to receive the lower ends of said links. In the outer ends of the latter are pivotally mounted flask clamping handles 26 provided with hooked projections 27 that, in the operative position of said handles are adapted to engage a clamping bar disposed transversely of the flask and thus securely retain the latter in place on the frame pending the rolling over of said frame.

Adverting next to the swinging table 6 which supports the flask carrier, such table will be seen (Figs. 1, 2 and 5) to comprise a hollow frame which is adapted to be normally supported entirely free of the main frame of the machine by an integral arm 28 extending diagonally from one corner of such hollow frame and pivoted, as previously described, to end standard 1 of said main frame. The details of the pivotal mounting of the arm are shown in Fig. 4. As there shown a vertically disposed shaft 29 is rotatably held in fixed vertical position by suitable bearings 30 and 31 in said end frame. This shaft is threaded through a portion of its length to receive an internally threaded sleeve 32 that is vertically movable but held against rotation by means of a lug 33 projecting laterally therefrom to engage a guide-way 34 therefor provided in the adjacent portion of the standard proper. Said sleeve 32 carries the weight of the arm 28 and table 6, although such arm has additional lateral bearing at the upper portion of the shaft, as clearly shown in the figure in question. The extreme upper end 35 of the shaft projects above the bearing 30 and is squared so as to receive a suitable wrench or the like, whereby it may be rotated to correspondingly raise or lower the internally threaded sleeve 32 and thus raise or lower the swinging table supported therefrom. A set bolt 36 in the bearing serves to secure such shaft in desired adjusted position. A cover 66 of canvas or like flexible material incloses the lower threaded portion of shaft 29 which would otherwise be exposed.

The flask carrier 37 proper, (see Figs. 1, 2 and 5) is mounted in the hollow swinging frame of the table 6 thus pivotally supported from the main frame of the machine in adjusted vertical position, said carrier being, furthermore, vertically adjustable in the swinging table frame to lower the flask away from the pattern in the parting operation. Provision for this latter vertical adjustment, or reciprocation, is made by forming the ends of the carrier with V-shaped guides 38 that are adapted to fit in corresponding guide ways 39 adjustably held in slots or grooves 40 formed in the ends of the hollow frame. Set screws 41 with suitable lock nuts 42 serve to retain the said guide ways in desired position, whereby any wear may be taken up, and consequent looseness in the movement of the carrier avoided. In order to further steady the movement of the carrier the latter is also provided with a downwardly extending central stem 64 fitted in a guide bearing 65 in the swinging frame.

Vertical reciprocation of the carrier 37 thus to lower a flask, as also to restore such carrier to its normal raised position preliminary to the reception of a flask thereon, is accomplished by means of the mechanism shown in Figs. 1 and 2 and again in more detail in Figs. 5 and 6. Such mechanism comprises an operating shaft 43 journaled in a suitable bearing 44 in swinging table 6 and provided at its outer end with a crank 45 or the like, and at its inner end with a disk 46. Such disk, which as shown is in effect merely a segment of a complete disk, is provided with an eccentrically disposed pin 47 that forms, in effect, a wrist pin for reciprocating the flask carrier. This wrist pin is connected with the carrier by being provided with a sliding block 48 that is slidably held in a horizontally disposed slot 49 or way incorporated in the carrier structure. In the upper position of the carrier, such block is designed to be thrown slightly over the center or axis of the disk and operating shaft, so that the carrier will be securely retained in such position, movement of the disk being thus limited by an adjustable stop 50 secured in the slot wherein the block is slidably held.

From the foregoing described construction, it will be obvious that rotation of the operating shaft 43 and so of disk 46 will serve to raise and lower the carrier in the fashion and for the purpose previously described.

In order to support the mold in unchanged position while it is being freed from the pattern, adjustable means are provided on the carrier to receive and support the flask. These means, in the preferred form illustrated, comprise a series of four vertically reciprocable pins or plungers 51 held in suitable pockets 52, one at each corner of the rectangular skeleton top of the carrier. Beneath each plunger 51 is disposed a compression spring 54 adapted to normally retain the same in elevated position until it is brought into contact with the bottom of the rolled over flask.

In order to lock the pins in the more or less depressed position which they are thus forced to assume, two similarly curved, oppositely disposed locking bars 55 of the general form clearly shown in Fig. 1 are provided. Each such bar, in other words, resembles a flattened U, its outer ends having a sufficient spread to respectively enter apertures 56 in the sides of the pockets that receive the corresponding pair of reciprocable plungers, and being slightly concaved to conform with the cross-section of the pins and be capable of having correspondingly increased frictional contact therewith. The central portions of the locking bars extend inwardly substantially to the center of the carrier top. Rotatably mounted, however, intermediately between such inner portions of the bars, is a locking member 57 having a pair of oppositely disposed similar cam faces (Fig. 10) which, upon rotation of such member, respectively engage said locking bars to force the same outwardly and thus cause their extremities to press against the pins. Said cam member 57 is also provided with an integral handle or operating lever 58, the outer end of which lies clear of the top of the carrier in convenient reach of the operator.

In order to retain the swinging table in its innermost position, wherein the flask carrier is located below the oscillatory pattern frame, a suitable latch is provided, Figs. 1 and 2, consisting of a vertical rod 59 held between the arms of a bracket 60 extending inwardly from end standard 2, and a catch 61 pivotally attached to the outer, or free, end of the swinging table and adapted in the inner position of the latter to engage said rod. A spring 62 normally thus urges said catch into engagement with the rod and a handle 63 is provided on the catch for the convenience of the operator in releasing the table when it is desired to swing the same outwardly.

Having thus described in detail the various structural features characterizing our improved roll-over molding machine, the manner of its operation may be briefly set forth. It has already been explained that the pattern plate (not shown) is designed to be secured in the pattern frame 5 by means of the clamping plates 10, and the flask then placed over the same and filled, all while the pattern frame is in the position indicated in full lines in the several assembled views shown in the drawings. After the flask has been filled with sand and the bottom board put in place and clamped down by means of the flask clamping devices, the frame, pattern flask, and all are rolled over, which serves at the time to elevate the flask, by reason of the off-setting of the frame from its axis. During such filling of the flask and rolling over of the same, the table 6, of course, is swung out of the way to the left as indicated in dotted outline in Fig. 1. Upon the pattern frame being thus rolled over, however, the table is swung in under the same, the plane in which it thus swings having been previously determined, by rotation of the threaded shaft 29 about which it is pivotal, so as to bring the depressible pins 51 on the flask carrier just a trifle higher, in the raised position of such carrier, than the bottom mold board on the flask in the inverted position of the latter. Said carrier, of course, is in its depressed position when the table is thus swung in, but it will follow that upon elevation of the carrier, the depressible pins in question will be brought into contact with the bottom of the mold and depressed more or less, depending upon any unevenness in the way such mold hangs, or any irregularities on its bottom. The table having been locked automatically as it is swung into the position just noted, by the engagement of catch 61 with rod 59, the depressible pins are next likewise locked in their depressed positions, so that they may be capable of sustaining the entire weight of the flask, upon the latter being released from the pattern frame, which constitutes the next step in the operation. The carrier is thereupon lowered so as to draw the flask and the molded sand therein away from the pattern, which operation is technically called "parting" the mold from the pattern. Upon the mold being freed from the pattern, the table may be swung again into its outer position, and the mold taken thence; in the meantime the oscillatory pattern frame may be rolled back into its normal position and another flask placed thereon and the making of another mold undertaken forthwith.

From the foregoing description of the operation of the machine it will be apparent that various and important advantages are secured. Prime among these is the removal of the flask carrier, with the mold, entirely away from the machine proper, as just described, just as soon as the "parting" step has been accomplished, so that the filling of another flask may be proceeded with even though delay is involved in removing the previously filled flask from the carrier, as by having to patch or touch up the mold therein. Any such touching-up in roll-over machines of the prevailing type, involves a corresponding interruption of the molding operation, all of which is obviated here. Furthermore, the offsetting of the pattern frame gives the advantage of an ample clearance for the lowering away of the flask from the pattern in the parting operation, while still leaving the pattern at an elevation where it is readily accessible to the workman filling the same. The various detailed structural features characterizing the swinging table and flask carrier insure the accurate adjustment of such carrier to any inequalities in the mold, as also a straight, smooth draw, allowing the mold to drop away from the pattern without any jar or wavering, such as is a prolific cause of injury to the mold in all molding machines. Finally the machine in all its parts is readily adjustable for various depths and sizes of flasks so as to be capable of use for a wide range of work.

Other modes of applying the principle of our invention may be employed instead of the one explained, change being made as regards the mechanism herein disclosed, provided the means stated by any one of the following claims or the equivalent of such stated means be employed.

We therefore particularly point out and distinctly claim as our invention:—

1. In a machine of the class described, the combination of a pattern frame oscillatory about a substantially horizontal axis; a support movable below and transversely of said frame; means for vertically adjusting said support; and a flask carrier mounted in said support so as to be vertically reciprocable.

2. In a machine of the class described, the combination of a pattern frame oscillatory about a substantially horizontal axis; a support adapted to swing horizontally below said frame; means for vertically adjusting said support; and a flask carrier mounted in said support so as to be vertically reciprocable.

3. In a machine of the class described, the combination of a pattern frame oscillatory about a substantially horizontal axis; a vertically disposed shaft; a support pivoted on said shaft so as to swing below said frame; and a flask carrier vertically reciprocable in said support.

4. In a machine of the class described, the combination of a pattern frame oscillatory about a substantially horizontal axis; a vertically disposed, rotatably supported shaft having a threaded portion; an internally threaded sleeve mounted on said shaft but held against rotation, so as to be raised or lowered by rotation of said shaft; a support pivoted on said sleeve so as to swing below said frame; and a flask carrier vertically reciprocable in said support.

5. In a machine of the class described, the combination of a pattern frame oscillatory about a substantially horizontal axis; a support adapted to swing horizontally below said frame; means adapted to secure said support in such inner position; and a flask carrier vertically reciprocable in said support.

6. In a machine of the class described, the combination of a pattern frame oscillatory about a substantially horizontal axis; a support adapted to swing horizontally below said frame; a spring catch adapted automatically to secure said support in such inner portion; and a flask carrier vertically reciprocable in said support.

7. In a machine of the class described, the combination of a pattern frame oscillatory about a substantially horizontal axis; a support adapted to swing horizontally below said frame; a flask carrier vertically reciprocable in said support; and means adapted to reciprocate said carrier, said means including an operating shaft mounted in said support, and eccentric connections between said shaft and carrier.

8. In a machine of the class described, the combination of a pattern frame oscillatory about a substantially horizontal axis: a support adapted to swing horizontally below said frame: a flask carrier vertically reciprocable in said support; and means adapted to reciprocate said carrier, said means including an operating shaft mounted in said support, a disk on the inner end of said shaft, a wrist pin on the face of said disk, and a slide way on said carrier disposed transversely of said shaft and engaging said pin.

9. In a machine of the class described, the combination of a pattern frame oscillatory about a substantially horizontal axis; a support adapted to swing horizontally below said frame; a flask carrier vertically reciprocable in said support; and means adapted to reciprocate said carrier, said means including an operating shaft mounted in said support, a disk on the inner end of said shaft, a wrist pin on the face of said disk, and a depending bracket on said carrier disposed transversely of said shaft and provided with a slideway engaging said pin.

10. In a machine of the class described, the combination of a pattern frame oscillatory about a substantially horizontal axis; a support adapted to swing horizontally below said frame; a flask carrier vertically reciprocable in said support; and means adapted to reciprocate said carrier, said means including an operating shaft mounted in said support, a disk on the inner end of said shaft, a wrist pin on the face of said disk, a depending bracket on said carrier disposed transversely of said shaft and provided with a slideway, and a slide-block in said slideway fitted on said pin.

11. In a machine of the class described, the combination of a pattern frame oscillatory about a substantially horizontal axis; a support adapted to swing horizontally below said frame: a flask carrier vertically reciprocable in said support; and means adapted to reciprocate said carrier, said means including an operating shaft mounted in said support, a disk on the inner end of said shaft, a wrist pin on the face of said disk, a depending bracket on said carrier disposed transversely of said shaft and provided with a slideway, a slide-block in said slideway fitted in said pin, and an adjustable stop in said slideway to limit movement of said block.

12. In a machine of the class described, the combination of a frame; a carrier reciprocably held in said frame; and means for reciprocating said carrier, said means including an operating shaft mounted in said frame and provided at its inner end with a disk, a wrist pin on the face of said disk, a depending bracket on said carrier disposed transversely of said shaft and provided with a slideway, a slide-block in said slideway fitted in said pin, and an adjustable stop in said slideway to limit movement of said block.

13. In a machine of the class described, the combination of a pattern frame oscillatory about a substantially horizontal axis; a support adapted to swing horizontally below said frame; a flask carrier vertically reciprocable in said support; and adjustable means on said carrier adapted to support a mold upon freeing the latter from a pattern attached to said pattern frame.

14. In a machine of the class described, the combination of a pattern frame oscillatory about a substantially horizontal axis; a support adapted to swing horizontally below said frame; a flask carrier vertically reciprocable in said support; means on said carrier normally adjustable to unevenness in a mold bottom; and means adapted to retain said first-named means against further adjustment.

15. In a machine of the class described, the combination of a pattern frame oscillatory about a substantially horizontal axis; a support adapted to swing horizontally below said frame; a flask carrier vertically reciprocable in said support; and a plurality of independently adjustable members each adapted to support a mold at one of a series of laterally spaced points, while freeing said mold from a pattern attached to said pattern frame.

16. In a machine of the class described, the combination of a pattern frame oscillatory about a substantially horizontal axis; a support adapted to swing horizontally below said frame; a flask carrier vertically reciprocable in said support; laterally spaced members on said carrier normally movable relatively to each other and adapted to support a mold upon freeing the latter from a pattern attached to said pattern frame; and means adapted to render said members relatively immovable.

17. In a machine of the class described, the combination of a pattern frame oscillatory about a substantially horizontal axis, said frame being offset from such axis; a vertically adjustable support movable below and transversely of said frame; and a flask carrier vertically reciprocable in said support.

18. In a machine of the class described, the combination of a pattern frame oscillatory about a substantially horizontal axis, said frame being offset from such axis; a vertically adjustable support adapted to swing horizontally below said frame; and a flask carrier vertically reciprocable in said support.

19. In a machine of the class described, the combination of a pattern frame oscillatory about a substantially horizontal axis;

means adapted to limit oscillation of said frame in one direction to determine its normal position; a spring pressed bolt adapted to lock said frame in either such normal or its inverted position; and a flask carrier adapted to receive a mold from said frame when in inverted position.

20. In a machine of the class described, the combination of a pattern frame oscillatory about a substantially horizontal axis; adjustable means adapted to limit oscillation of said frame in one position; means adapted to lock said frame in either normal or inverted position, and a flask carrier adapted to receive a mold from said frame when in inverted position.

Signed by us this 28th day of May, 1910.
CHARLES F. KNOWLTON.
FRANK F. ELLIOT.

Attested by—
C. H. Knox,
L. H. McCabe.